E. MORGAN.

MEASURING ATTACHMENT FOR PACKAGED FABRICS.

No. 7,123. Reissued May 23, 1876

*Witnesses:*

W. B. Masson

W. C. Chaffee

*Inventor:*

Edward Morgan by E. E. Masson
atty

UNITED STATES PATENT OFFICE.

EDWARD MORGAN, OF WASHINGTON, DISTRICT OF COLUMBIA, ASSIGNOR, BY MESNE ASSIGNMENTS, TO PETER H. WATSON.

IMPROVEMENT IN MEASURING ATTACHMENTS FOR PACKAGED FABRICS.

Specification forming part of Letters Patent No. 111,235, dated January 24, 1871; reissue No. 7,123, dated May 23, 1876; application filed May 3, 1876.

*To all whom it may concern:*

Be it known that I, EDWARD MORGAN, of the city of Washington, in the District of Columbia, have invented a new and useful Improvement in the Manufacture of Fabrics into Packages for Storage or Sale, of which the following is a description, reference being had to the accompanying drawing, which makes part of this specification, and in which—

Figure 1:
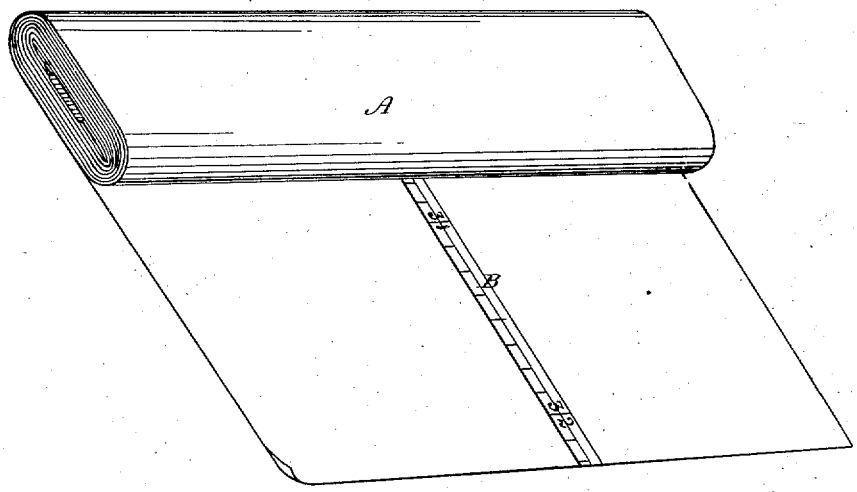
Figure 2:
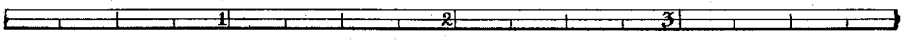

Figure 1 represents, in perspective, an example of a package of cloth made according to my improved method, with a yard or two, upon a reduced scale, of the end of the web unfolded and outstretched; and Fig. 2 represents, in plan, a remnant of a sheet or web of paper graduated, upon a reduced scale, into linear-yard units and fractions thereof, the yards being numbered consecutively from one end of the web to the other.

In these figures, A indicates the cloth, and B the paper.

When fabrics made in sheets or webs, of the class usually cut into pieces to suit the wants of customers when sold at retail, are put up in packages by rolling or folding, for storage or sale, in the manner heretofore customary, they are measured by hand and the measure marked upon the end of the web, or upon a tag attached to the end, so that when the mark is obliterated or the tag lost from the original roll, or the marked end is cut off in retailing the cloth, the quantity contained in the roll, whether integral or remnant, can only be ascertained by unrolling and remeasurement, an operation of considerable labor, in which injury to the appearance of the fabric from crumpling and soiling can scarcely be avoided. When a definite number of yards from the end of the piece in such a package is wanted, it is ascertained where to make the cut to sever the quantity desired by the manual application of a yard-measure.

One of the objects of my invention is to avoid such manipulation in obtaining pieces of definite length from the end of a roll of cloth, and in ascertaining either the integral length of a roll or the length of any remnant thereof. I have discovered that this object can be accomplished by so preparing the fabric and putting it up in packages that every part of it will be self-measuring, and the end at the outside of the package will always exhibit the true length of cloth within, whether it be the integral piece or only what remains after portions have been cut off.

In the example shown in the drawing, my invention is carried into effect by taking a piece of paper of convenient length, measuring it lengthwise into yard-units, or other units, if preferred, graduating these units, and, when necessary, subdivisions thereof, and numbering the units so graduated consecutively from one end of the piece to the other. Such graduation and notation exhibits to the eye the length of the piece, and, assisted by this simple operation of mental subtraction, will indicate the point at which a cut is to be made to obtain a piece of given length from the end at which the notation terminates. The terminal graduation and notation on the remnant will exhibit how much of it is left, so that when the piece of paper so graduated and notated is formed into a package by folding or rolling, beginning the folding at the end at which the graduation begins, the graduation and number at the terminal end on the periphery of the roll will exhibit the length of the piece within the package The paper thus measured, graduated, numbered, and packaged not only is self-measuring and exhibits its own length on the outside of the package, but will also virtually impart the same qualities to a web of cloth of the same length with which it is placed in exact apposition, and both together so rolled or folded into a common package. This application of my invention is very important in saving time and labor in retailing dry-goods or in taking accounts of stock.

If the cloth so measured and packaged be thick and inelastic and the paper hard and firm, the paper will creep slowly along the concave surface of the fabric instead of resting in strict apposition with it, as they are winding round and round to form the package, until at the finish the end of the paper will extend beyond that of the cloth. In such a case, if a piece of given length is wanted from the roll, it must be unfolded to the extent necessary, the unfolded portions of both paper and cloth placed in due apposition, and the desired length severed from both. The terminal notation and graduation left on the roll will exhibit the length of cloth remaining, while the graduation and notation on the severed paper will show the length of the piece of cloth cut off.

If the cloth be thin or very elastic, the graduated paper very thin, and the package tightly coiled, the creeping of the paper over the cloth will be inconsiderable, and the units of measure of the web and paper will be so nearly in apposition throughout the entire extent of both that fabrics of moderate cost may be measured and cut into pieces, with all needful and more than the usual precision, by severing the cloth and paper just as they lie together unfolded to the graduation-mark which indicates the length of the piece to be cut off.

The graduated paper, when thus combined with a web of cloth in a folded package, obviously becomes, in effect, the linear measure and numbered graduation of every portion of the web, to record and exhibit its linear extent.

The paper may be made of any convenient width, and the graduation-marks and numbers may be affixed upon it by printing. When expedient, several series of numbered graduation-marks may be printed on a broad web of paper, which afterward may be slit into narrow strips, each containing one of the series.

What I claim is—

1. Manufacturing into packages fabrics graduated into numbered linear units, and folded in such manner as shall make them self-measuring from end to end, and exhibit their length without unfolding them, whether the package be whole or a remnant, substantially as described.

2. Manufacturing into packages webs of such goods as are commonly cut into pieces for sale or use, by combining with them numbered graduation-marks, and folding or rolling them in such manner as shall make them self-measuring and exhibit their length without unfolding, substantially as described.

EDWARD MORGAN.

Witnesses:
W. T. JOHNSON,
W. B. MASSON.